April 25, 1967 H. P. SHERLOCK 3,316,343
HEAT SHRINKABLE CONNECTOR WITH PRE-PLACED SOLDER THEREIN
Filed Jan. 3, 1966
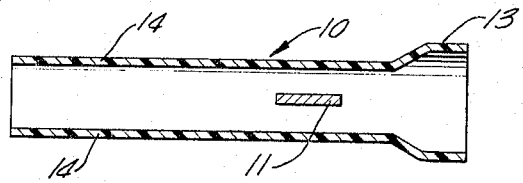
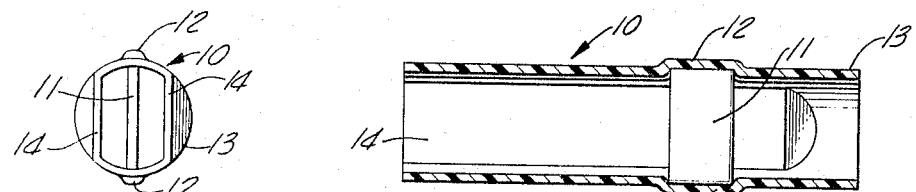
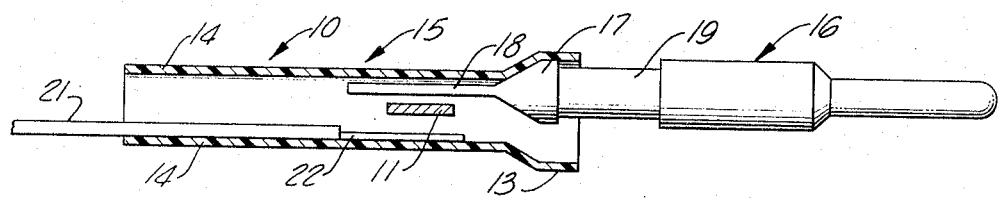
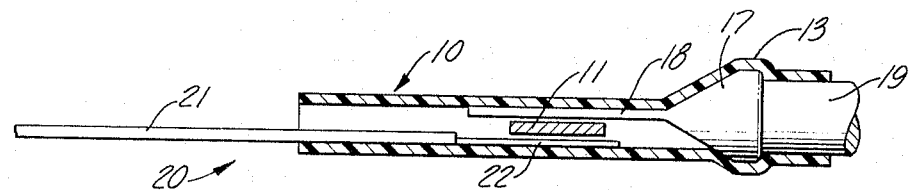
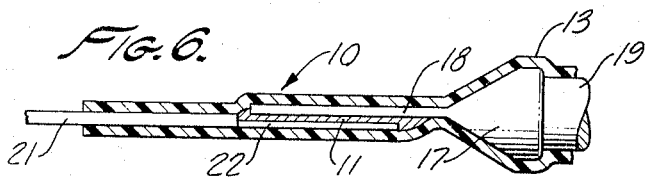
HUGH PAUL SHERLOCK
INVENTOR.
BY Lyon & Lyon
ATTORNEYS

United States Patent Office 3,316,343
Patented Apr. 25, 1967

3,316,343
HEAT SHRINKABLE CONNECTOR WITH PRE-PLACED SOLDER THEREIN
Hugh Paul Sherlock, Menlo Park, Calif., assignor to Raychem Corporation, Redwood City, Calif., a corporation of California
Filed Jan. 3, 1966, Ser. No. 518,134
5 Claims. (Cl. 174—84)

This invention relates to a connector and more particularly relates to an electrical connector for use in joining relatively flat electrical conductors.

In Wetmore application Ser. No. 211,747, filed July 23, 1962, now Patent No. 3,243,211, several types of novel electrical connectors are disclosed. The electrical connectors of the Wetmore application, the disclosure of which is incorporated by reference herein, include a dimensionally heat unstable member such as a sleeve in which is placed a ring or ball-shaped solder insert. In a typical connector of this type, both ends of the members or sleeve are open to receive the electrical conductors that are to be connected. The connector is then heated causing the member or sleeve to shrink and firmly grip the electrical conductors. The heat also causes the solder to flow and form a soldered connection between the two electrical conductors. The sleeve acts to contain the movement of the solder so that a good soldered joint is assured.

In general, such members or sleeves are made of a material capable of having the property of plastic or elastic memory imparted thereto and are expanded under heat and pressure to a diameter greater than their normal diameter and cooled while kept under pressure. A sleeve treated in this manner will retain its expanded position until it is again heated to above its heat recovery temperature at which time it will recover to its original shape. Examples of material useful in forming such dimensionally heat unstable recoverable members may be found in Currie Patent 2,027,962 and Cook et al. Patent 3,086,242, the disclosures of which are incorporated herein by reference. Polymeric materials which have been cross-linked by chemical means or by irradiation, for example, with high energy electrons or nuclear radiation, such as those disclosed in the Cook et al. patent are preferred for use in the present invention. Non-crystalline polymeric materials exhibiting the property of plastic or elastic memory, such as polyurethane, ionomers, etc., could also be used in practicing the present invention. The connector of the present invention is equally useful with sleeves made from materials having either plastic or elastic memory; consequently, as used herein, the term "elastic memory" and "plastic memory" are used interchangeably and are intended to be mutually inclusive.

While the use of a ring or collar of solder is satisfactory for making various electrical connections, it has been found that in the case of attaching wires or flat cable to flat or tab type terminals, the ring may not provide sufficient solder flow between the wires and tab. It has also been found that a certain skill is required to properly locate a wire or flat cable in the sleeve once one end of the sleeve has been installed on a terminal because the sleeve tends to flap around once installed.

It is therefore an object of the present invention to provide a connector for joining a plurality of objects.

It is also an object of the present invention to provide an electrical connector for forming a soldered connection to a flat electrical conductor.

It is another object of the present invention to provide such a connector utilizing a heat recoverable sleeve.

It is a further object of the present invention to provide such a connector wherein two electrical conductors are inserted on either side of a solder insert.

These and other objects and advantages of the present invention will become more apparent upon reference to the accompanying description and drawing in which:

FIGURE 1 is a side view in cross section of the electrical connector of the present invention;

FIGURE 2 is a plan view in cross section of the connector of the present invention;

FIGURE 3 is an end view as seen from the left end of FIGURE 2 of the connector of the present invention;

FIGURE 4 is a side elevation partly in section, showing the connector of the present invention prior to its installation on a terminal pin and with a flat electrical conductor inserted therein;

FIGURE 5 is a side elevation, partly in section, showing the connector of the present invention partially recovered on a terminal pin only and with a flat electrical conductor inserted therein; and FIGURE 6 is a side elevation, partly in section, of the connector of the present invention after the sleeve thereof has been completely recovered and the solder has formed an electrical joint.

Briefly, the present invention is directed to an electrical connector comprising a sleeve of heat recoverable material having a flat soldered insert positioned therein. The sleeve is partially recovered around the flat solder insert to hold it in place and to form two cavities, one on either side of the insert, for receiving electrical conductors, such as flat cables or tab-type terminal pins. The use of these two cavities insures that the two conductors are inserted into the sleeve on opposite sides of the flat solder insert. When heat is applied, the sleeve shrinks and presses the two conductors against the solder insert and causes the insert to melt and bond the conductors together. Since the flat solder insert is positioned between the two conductors, sufficient solder between the conductors is assured.

Turning now to the drawing, FIGURES 1 thru 3 show an electrical connector constructed in accordance with the present invention. A dimensionally heat unstable tubular member or sleeve 10 has a flat, rectangular solder insert 11 positioned therein, the solder insert 11 being generally positioned in a plane that includes the longitudinal axis of the sleeve 10. The insert 11 preferably comprises both solder and a suitable flux. The material from which the sleeve is formed preferably has a crystalline melting temperature or recovery temperature below that of the fusing temperature of the solder insert. When an insert such as solder is used that is rigid during at least a portion of the recovery of the sleeve, it has been found that unexpectedly superior results are obtained when a sleeving material is used that exhibits elastomeric properties when heated to at least its crystalline melting temperature. Such a material has a wide range of useful recovery temperatures and thus permits the utilization of a single sleeving material with a wide range of solder compositions. For best results, the sleeve 10 is partially recovered around the insert 11 to cause it to form bulges 12 in the sides of the sleeve 10, thereby holding it firmly in place. As shown in these figures, the sleeve 10 is provided with an expanded end portion 13 for receiving one of the electrical conductors, for example, a terminal pin. However, it should be understood that this expanded end portion need not be provided or, if desired, both ends can be provided with expanded or otherwise shaped portions.

The partial recovery of the sleeve 10 is preferably accomplished by use of a mandrel having flattened sides so that the main portion of the sleeve 10 will, upon recovery, also have flat sides as shown at 14. The provision of the flat sides 14 create two generally rectangular cavities for receiving the electrical conductors and thus make their proper placement simple and quick. The mandrel, if desired, may have a slight outward taper to facilitate its removal from the sleeve after the sleeve is shrunk. Since the heat recovery temperature of the material from which the sleeve is made is preferably below that of the melting temperature of the solder, a brief application of heat will cause the sleeve to shrink without causing the solder or flux to melt or flow. This effect can also be enhanced by constructing the mandrel of a material having relatively poor heat conduction characteristics so that heat is not transferred to the solder before the sleeve has shrunk.

FIGURE 4 shows the electrical connector positioned over a terminal pin 16 having a conical tip 17 from which extends a flat tab 18. The pin 16 is also provided with a reduced diameter portion 19 adjacent to the conical tip 17. The tab 18 is positioned above the insert 11 while a flat cable type electrical conductor 20 having an insulated portion 21 and an exposed conductive portion 22 is inserted into the sleeve 10 such that the conductive portion 22 is positioned below insert 11, that is, on the other side of the insert 11 from the tab 18. FIGURE 5 shows an assembly similar to that of FIGURE 4 in which the sleeve 10 has been recovered over the pin 16 prior to the insertion of the conductor 20. As can be seen, the expanded end portion 13 of the sleeve 10 has been recovered by heating to firmly engage the conical tip 17 and the reduced diameter portion 19 of the pin 16 to form a lock so that the sleeve 10 cannot be easily removed from the pin 16. This type of assembly may be desirable in instances where the terminal pin and sleeve are to be sold or installed as a complete unit.

FIGURE 6 shows the assembly of either FIGURE 4 or FIGURE 5 after sufficient heat has been applied to the assembly to cause the sleeve 10 to recover and the solder insert 11 to melt and flow. As can be seen, upon heating of the assembly to above the recovery temperature of the material of the sleeve 10 and the melting point of the solder insert 11, the sleeve 10 shrinks tightly around the insulated portion 21 of the conductor 20 and around the conical tip 17 of the pin 16, and causes the conductive portion 22 and the tab 18 to be pressed against the solder insert 11. As the heating continues, the flux in the solder insert flows to prepare the surfaces and then the solder melts to form the joint. The sleeve 10 continues to shrink, pressing the conductors into the molten solder while at the same time controlling the flow of the solder. Upon cooling the solder hardens and the sleeve cools to form an insulated mechanically supported solder connection. Since the heat is applied from outside the sleeve, the conductors 22 and 18 reach the melting temperature of the solder before the solder itself does and thus one of the requirements for a good soldered joint is met. The shrinking action of the sleeve assures close proximity of the metals of the conductors to be joined and lack of movement during cooling, two further requirements which must be met for good soldered joints.

From the foregoing description, it can be seen that the present invention provides an electrical connector which is ideally adapted for use with flat electrical conductors. The solder insert divides the recoverable sleeve into two separate cavities for the easy insertion of the two conductors and insures that sufficient solder is available between the two conductors for a good soldered joint. If desired, the sleeves may be constructed of a transparent material so that the soundness of the soldered connection can be visually inspected. While the description and drawings have been directed to a connector for electrical conductors using a solder insert, it will be apparent that various other objects can be connected and various other fusible inserts used in place of solder.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An article of manufacture comprising a connector for joining two members comprising a hollow tubular heat shrinkage member having an interior chamber formed by a wall comprising a material having the property of elastic memory when heated to at least its recovery temperature and a flat fusible solder insert positioned within said chamber with opposing edges of said insert firmly engaging said wall in two different locations dividing a portion of said chamber into two cavities for receiving a portion of one of said two members in one of said two cavities and a portion of the other of said two members in the other of said two cavities.

2. The article of claim 1 wherein said wall is partially recovered to firmly engage said edges of said insert.

3. The article of claim 1 wherein said recovery temperature of said material is below the fusing temperature of said solder.

4. The article of claim 1 wherein said material exhibits elastomeric properties when heated to at least its crystalline melting temperature.

5. The article of claim 1 wherein said tubular member is open at opposite ends and adapted to receive one of said two members through each end thereof.

References Cited by the Examiner

UNITED STATES PATENTS

| | | |
|---|---|---|
| 2,685,074 | 7/1954 | Lazzery. |
| 2,972,657 | 2/1961 | Stemke _____ 174—84 |
| 3,239,125 | 3/1966 | Sherlock. |

LEWIS H. MYERS, *Primary Examiner.*

D. L. CLAY, *Examiner.*